US007046962B1

(12) United States Patent
Belcea

(10) Patent No.: US 7,046,962 B1
(45) Date of Patent: May 16, 2006

(54) SYSTEM AND METHOD FOR IMPROVING THE QUALITY OF RANGE MEASUREMENT BASED UPON HISTORICAL DATA

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 434 days.

(21) Appl. No.: 10/197,573

(22) Filed: Jul. 18, 2002

(51) Int. Cl.
H04B 17/00 (2006.01)

(52) U.S. Cl. .................. 455/67.11; 455/67.14; 455/67.16; 455/115.1; 455/115.3; 455/404.2; 455/421

(58) Field of Classification Search ............. 455/67.11, 455/67.14, 67.16, 506, 515, 115.1, 115.3, 455/404.2, 421, 418
See application file for complete search history.

(56) References Cited

U.S. PATENT DOCUMENTS

| 4,494,192 | A |   | 1/1985  | Lew et al. ............. 364/200 |
| 4,617,656 | A |   | 10/1986 | Kobayashi et al. ........ 370/74 |
| 4,736,371 | A |   | 4/1988  | Tejima et al. ............ 370/95 |
| 4,742,357 | A |   | 5/1988  | Rackley ................. 342/457 |
| 4,747,130 | A |   | 5/1988  | Ho ...................... 379/269 |
| 4,910,521 | A |   | 3/1990  | Mellon .................. 342/45  |
| 5,034,961 | A |   | 7/1991  | Adams ................... 375/130 |
| 5,068,916 | A |   | 11/1991 | Harrison et al. .......... 455/39 |
| 5,231,634 | A |   | 7/1993  | Giles et al. ........... 370/95.1 |
| 5,233,604 | A |   | 8/1993  | Ahmadi et al. ........... 370/60 |
| 5,241,542 | A |   | 8/1993  | Natarajan et al. ...... 370/95.3 |
| 5,317,566 | A |   | 5/1994  | Joshi ..................... 370/60 |
| 5,381,444 | A | * | 1/1995  | Tajima .................. 375/141 |
| 5,392,450 | A |   | 2/1995  | Nossen .................. 455/12.1 |
| 5,412,654 | A |   | 5/1995  | Perkins ................. 370/94.1 |
| 5,424,747 | A |   | 6/1995  | Chazelas ................. 342/70 |
| 5,502,722 | A |   | 3/1996  | Fulghum ................ 370/69.1 |
| 5,517,491 | A |   | 5/1996  | Nanni et al. ............. 370/29 |
| 5,555,425 | A |   | 9/1996  | Zeller et al. ........... 395/800 |
| 5,555,540 | A |   | 9/1996  | Radke .................. 370/16.1 |
| 5,572,528 | A |   | 11/1996 | Shuen ................. 370/85.13 |
| 5,615,212 | A |   | 3/1997  | Ruszczyk et al. ......... 370/433 |
| 5,618,045 | A |   | 4/1997  | Kagan et al. ............ 463/40 |
| 5,621,732 | A |   | 4/1997  | Osawa ................... 370/79 |
| 5,623,495 | A |   | 4/1997  | Eng et al. .............. 370/397 |
| 5,627,976 | A |   | 5/1997  | McFarland et al. ........ 395/308 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

Primary Examiner—Doris H. To
Assistant Examiner—Minh Dao
(74) Attorney, Agent, or Firm—Kandi L. Karpinia; Joseph J. Buczynski

(57) ABSTRACT

A system and method for applying an algorithm to distance measurements between nodes in an ad-hoc communications network. The algorithm is located at an individual node of the ad-hoc network and processes collected data via a multi-path filter to ensure that range measurement data is correct, and if so, include such measurement data in a historical data matrix in which old measurement data is eliminated. During periods where received signals are unable to provide correct distance measurements due to reflections affecting the path between nodes or media absorption or radio energy, distance estimates may be obtained from this accurate historical data.

24 Claims, 9 Drawing Sheets

U.S. PATENT DOCUMENTS

| | | | |
|---|---|---|---|
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,073,005 A | 6/2000 | Raith et al. | 455/404 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,487,417 B1* | 11/2002 | Rossoni et al. | 455/67.16 |
| 6,738,044 B1* | 5/2004 | Holzrichter et al. | 345/158 |
| 2001/0053699 A1 | 12/2001 | McCrady et al. | 455/513 |
| 2002/0164996 A1* | 11/2002 | Dorenbosch | 455/456 |
| 2003/0134648 A1* | 7/2003 | Reed et al. | 455/456 |
| 2003/0232598 A1* | 12/2003 | Aljadeff et al. | 455/41.2 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2$^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4$^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR IMPROVING THE QUALITY OF RANGE MEASUREMENT BASED UPON HISTORICAL DATA

BACKGROUND OF THE INVENTION

1. Field of the Invention

The present invention relates to a system and method of applying an algorithm to distance measurements between nodes in an ad-hoc communications network to ensure accurate range measurement data is maintained. More particularly, the present invention relates to a system and method for using an algorithm at an individual node of an ad-hoc network to ensure that range measurement data is correct, and if so, to add the measurement data to a historical data matrix in which old measurement data is eliminated. During periods where received signals are unable to provide correct distance measurements due to reflections affecting the path between nodes or media absorption or radio energy, distance estimates may be obtained from this accurate historical data.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

The mobile nodes of such networks may assume any number of random positions within the network, making exact node location determinations when needed difficult. For computing node geographical coordinates in such ad-hoc wireless networks, algorithms in use at individual nodes in typical networks use the "Time Of Arrival" (TOA) measurement technique. As can be appreciated by one skilled in the art, a TOA measurement provides the distance between mobile nodes and wireless routers, which are used as references, for computing the mobile node position. The measurements are based upon signal propagation times, specifically the time a signal needs for traveling at the speed of light between a mobile node and fixed stations.

Due to various propagation factors, the modem that makes the TOA measurement does not receive direct signals all the time, but may also receive a number of secondary signals. Since secondary signals are reflections of the direct signal, each secondary signal travels a longer distance and therefore has a longer transmission path. In most cases, the measurement modem can identify and separate direct signals from secondary signals, and provide a correct propagation time. However, in some cases the direct signal may be too weak, when compared with reflected signals, to accomplish this. In such case, the measurement modem is not able to determine the correct propagation time.

Accordingly, a need exists for a system and method to filter out measurements that are incorrect and provide at any time, an estimate of the distance between terminals, even if they are not in direct radio contact.

SUMMARY OF THE INVENTION

An object of the present invention is to provide a system and method to correctly estimate the distance between nodes of a wireless ad-hoc communications network during periods where received signals are following both direct and reflected paths between nodes.

Another object of the present invention is to provide a system and method for maintaining accurate historical data relating to past range measurements to provide distance estimates during periods where received signals are unable to provide distance measurements due to reflected path transmissions between nodes.

These and other objects are substantially achieved by providing a system and method for applying an algorithm to distance measurements between nodes in an ad-hoc communications network. The algorithm is located at an individual node of the ad-hoc network and processes collected data via a multi-path filter to ensure measurement data is within a specific range, and if so, to include such measurement data in a historical data matrix in which old measurement data is eliminated. During periods where received signals are unable to provide distance measurements due to reflected path transmissions between nodes or media absorption, distance estimates may be obtained from accurate historical data.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
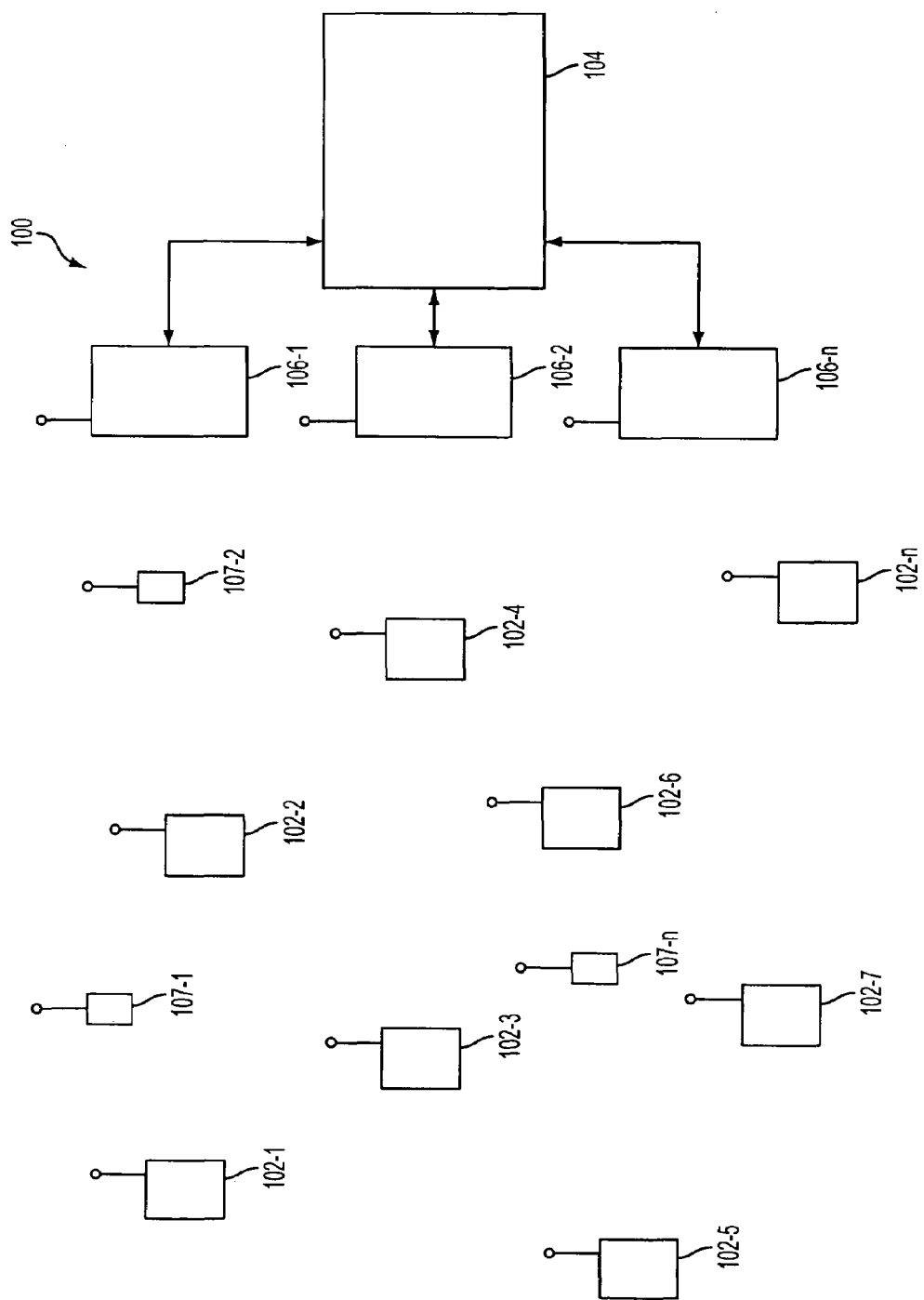
FIG. 1 is a block diagram of an example of an ad-hoc wireless communications network including a plurality of nodes employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-$n$ (referred to generally as nodes 102 or mobile nodes 102), and can, but is not required to, include a fixed network 104 having a plurality of access points 106-1, 106-2, . . . 106-$n$ (referred to generally as nodes 106 or access points 106), for providing nodes 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further can include a plurality of fixed routers 107-1 through 107-$n$ (referred to generally as nodes 107, fixed routers 107 or wireless routers 107) for routing data packets between other nodes 102, 106 or 107. Because they are not mobile, routers 107 are preferred for use as reference nodes for mobile node position measurements. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. patent application Ser. Nos. 09/897,790, 09/815,157 and 09/815,164 which are referenced above.

Figure 2:
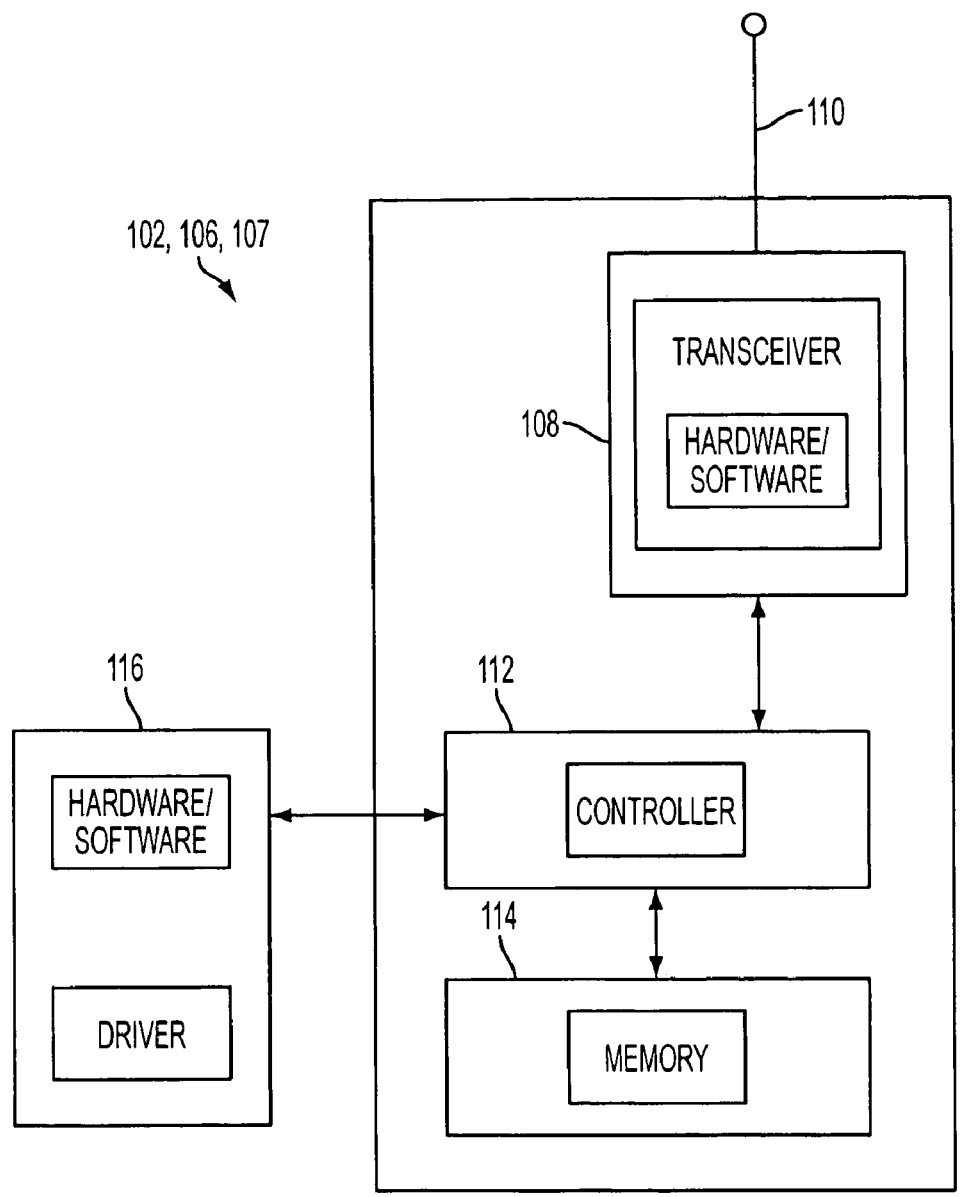
FIG. 2 is a block diagram of an example of a wireless node as shown in FIG. 1.

As shown in FIG. 2, each node 102, 106 and 107 has a transceiver including a transmitter and a receiver, which collectively can be referred to as a modem 108. As shown in FIG. 2, each node 102, 106 and 107 includes a modem 108 which is coupled to an antenna 110 and is capable of receiving and transmitting signals, such as packetized signals, to and from other nodes 102, 106 and 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

The modem 108 of each node also includes the capability to identify, differentiate and measure the arrival time of signals received at a node 102, 106 and 107, both via direct paths and reflected paths, from other nodes of the network. Algorithms in use at each node use the "Time Of Arrival" (TOA) measurement technique, and may provide the distance between nodes for computing individual node positions. The measurements are based upon signal propagation times, specifically the time a signal needs for traveling at the speed of light between a mobile node and fixed node, used as a reference.

As can be appreciated by those skilled in the art, the measurement of direct path signal arrival times is useful for identifying and measuring distances between nodes, such as between a mobile node 102 and a wireless router 107. The precision of this distance measurement has a direct impact on the accuracy of the geographical position determination of the mobile node as computed by a device, such as a "Location Service" module.

As shown in FIGS. 1 and 2, each node 102, 106 and 107 has the capability to distinguish and identify signals received via a direct path from signals received via a reflected path. However such identification is very difficult or almost impossible when adverse conditions prevent one node from communicating with another node in a direct path. For example, the communication between two nodes located in a building with concrete floors is often subject to signal reflection, diffraction and diffusion via objects located outside the building. In such conditions, the signals received via reflected paths could be much stronger than the signals received via the direct path, as the direct signal is attenuated by passing through concrete floors or absorbing objects. Unfortunately, such large level differences between the direct and secondary, or reflected, signal makes the identification of the direct signal almost impossible in some cases. Still further, when a mobile node enters a temporary "shadow" of an obstruction, it can communicate with other nodes only through reflected signals. Although such communication does not dramatically affect the quality of data transferred in the network, the measurement of direct signal arrival time for use in distance measurements becomes impossible. At such times, accurate historical data may be used to provide a distance estimate, however the estimate accuracy will rely heavily upon the historical data maintained at the node.

For example, in FIG. 1, the direct path between a mobile node 102 and a wireless router 107 may become continuously or temporarily obstructed due to the environment of the network 100. If the direct path between a node 102 and 107 is continuously obstructed, signals received at either node will consist largely of reflected signals received via an indirect path. The embodiment of the present invention described below presents a multi-path filter contained within an algorithm which may be used at a node to provide a correct distance between nodes if at least 10% of received signals are following a direct path between nodes. In cases where the direct path is obstructed only temporarily, but during which period all received signals are following reflected paths preventing accurate distance measurements from received signals using TOA techniques, the filter embodiment described below can still provide a correct distance estimate for almost a minute using a matrix of historical data maintained at the node.

The multi-path filter described below may be located at each node 102, 106 and 107 of FIG. 1, and may be located either at the modem of the node 108 or at the node host 116. As stated above, each node has the capability to distinguish and identify signals received from another node via direct and reflected paths, and using such signals and path information, determine and collect node distance values.

The multi-path filter of each node used to detect these alternate path signals and provide accurate distances includes two stages. In a first stage of the filter, the measured distance between nodes, such as a mobile node 102 and router node 107, is checked against previously measured distances. In this example, the router node, or node 107 is used as a reference for distance measurement between the router 107 and a single mobile node 102. The speed of distance change, or the relative speed between nodes, is used to compute an expected distance. If the measured distance is very long compared with the expected distance, it is rejected and not considered for improving the collected information.

A new measurement is accepted if it is smaller than the expected distance plus a fraction of the standard deviation of errors. In the present embodiment this fraction was selected as 30%, but various applications may require different values. The standard deviation is computed using all measurements, regardless of the fact that they were rejected or not as presented in equation (5). The expected distance is computed with the relation presented in equation (1) where V an $d_0$ are computed using the Least Square Method.

In the second stage of the filter all range measurements that were not rejected are considered as "historical data". The "storage" for the historical data is in fact the matrix of a Least Square Method applied to the linear model of the distance variation between nodes. The model equation is presented in equation (1) as:

$$d(t) = V*t + d_0 \quad (1)$$

The unknown elements in the model equation (1) are the speed of the distance variation V and the initial distance $d_0$, used then to determine the distance between nodes $d(t)$.

The system of equations, or algorithm, associated to the linear model of range change is shown in equation (2) below.

$$\begin{cases} V \sum_{i=1}^{n} t_i^2 + d_0 \sum_{i=1}^{n} t_i = \sum_{i=1}^{n} d_i t_i \\ V \sum_{i=1}^{n} t_i + n^* d_0 = \sum_{i=1}^{n} d_i \end{cases} \quad (2)$$

In equation (2), the variables $d_i$ are the measured distances between the nodes, or in our example, mobile node 102 and router node 107, and variables $t_i$ are the times when distances were measured. For use in equation (2) however, distances $d_j$ have to pass the first stage of the multi-path filter. As described above, in the first stage filter, the measured distance between nodes is checked against previously measured distances and the speed of distance change, or the relative speed between nodes, is used to compute an expected distance. If the measured distance is very long, it is rejected and not considered for improving the collected information.

For very large collections of data, the number in the matrix associated with equation (2) may become very large due to summation of a large number of data. Therefore, to prevent the numbers within the matrix associated with equation (2) from becoming too large, a "forget factor" is used. The forget factor creates a variable weight w for each set of measurements. After considering the forget factor, where 0<w<1, equation (2) becomes equation (3).

$$\begin{cases} V \sum_{i=1}^{n} w^{n-i} t_i^2 + d_0 \sum_{i=1}^{n} w^{n-i} t_i = \sum_{i=1}^{n} w^{n-i} d_i t_i \\ V \sum_{i=1}^{n} w^{n-i} t_i + d_0 \sum_{i=1}^{n} w^{n-i} = \sum_{i=1}^{n} w^{n-i} d_i \end{cases} \quad (3)$$

Since the value of w is less than one (w<1), the weight of older records becomes very small and the algorithm essentially "forgets" very old measurements, and allows substitutions as directed by equation (4).

$$a_{1,1} = \sum_{i=1}^{n} w^{n-i} t_i^2 \quad (4)$$

$$a_{1,2} = a_{2,1} = \sum_{i=1}^{n} w^{n-i} t_i$$

$$a_{2,2} = \sum_{i=1}^{n} w^{n-i}$$

$$b_1 = \sum_{i=1}^{n} w^{n-i} d_i t_i$$

$$b_2 = \sum_{i=1}^{n} w^{n-i} d_i$$

After making the substitutions indicated in equation (4), the system of equations can be rewritten as shown in equation (5).

$$\begin{cases} a_{1,1} V + a_{1,2} d_0 = b_1 \\ a_{2,1} V + a_{2,2} d_0 = b_2 \end{cases} \quad (5)$$

The values of V and $d_0$ computed from equation (5) are then used for computing the expected distance $d(t_i)$ and the current error $\epsilon_i$ of the measured distance $d_1$. The individual error $\epsilon_i$ is then used for computing the standard deviation of errors $\sigma$ in equation (6).

$$\epsilon_i = d_i - (v * t_i + d_0) \quad (6)$$

-continued $$\sigma^2 = \frac{\sum_{i=1}^{n} \varepsilon_i^2}{\left(\sum_{i=1}^{n} w^{n-i}\right) - 2}$$

If the standard deviation of errors σ becomes too large, the system of equations (1) through (6) is erased and the algorithm starts again. The limit of the standard deviation when the algorithm is restarted depends on the requirements of the application using the algorithm. A very large standard deviation is a sign that the linear approximation of distance variation does not match the actual distance value. This situation typically occurs when the mobile node 102 changes suddenly the moving direction.

The multi-path filter described above may be tested under various conditions using randomly generated data. For each test, two charts may be created showing a measurement variation and error distribution, as shown in FIGS. 4–15. Although the multi-path filter deals with time measurements, each test indicates error in terms of distance, or meters. Filter input is provided as propagation times between a mobile node 102 and wireless router 107, therefore as appreciated by those skilled in the art, converting propagation times to distances merely requires application of a conversion factor equal with the speed of light.

Testing the use of the multi-path filter in distance measurements requires calculating a distance between two nodes, as various factors are used to simulate noise generation and reflected path signals. In the example shown in FIG. 3, a distance 120 is to be measured between a mobile node 102 which is moving at a velocity of 30 m/s on a straight course, such as a highway, and a fixed wireless router 107 in accordance with the embodiment of the present invention described in equations (1) through (6).

Figure 3:
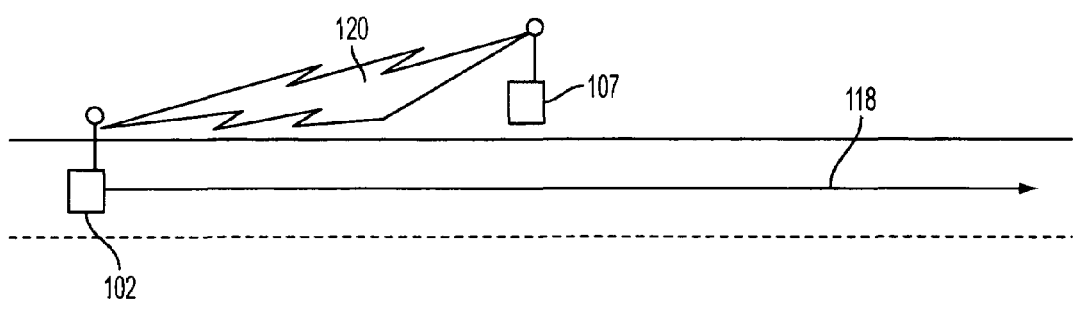
FIG. 3 is a block diagram of an example of a technique for performing distance measurement in accordance with an embodiment of the present invention.

As shown in FIG. 3, the mobile node is traveling on a straight path 188, approaching a fixed router 107 from a distance of approx. −1100 m, passing at a closest distance of approx. 5 m, and moving away to a distance of approx. +1100 m. The router 107, used as a reference in this example, is located at a position 5 m from the mobile moving path 118.

The distance 120, or $d_1$ from equation (2), between the router 107 and the mobile node 102 in FIG. 3 is measured at a first time, or $t_1$ from equation (2), when the mobile node 102 is approx. −1100 m from the router 107, and thereafter at time intervals $t_i$ for a duration of approximately 70 seconds, depending upon the speed of travel at node 102. As can be appreciated by one skilled in the art, the movement configuration, measurement intervals and specific nodes used in FIG. 3 are presented as an example of the use of the multi-path filter in accordance with an embodiment of the present invention. Many other configurations may be used in accordance with this, or other embodiments.

In the example of FIG. 3, after 33.333 seconds, the distance 120 between nodes 102 and 107 is minimal (i.e. 5 m) as the mobile node passes by the fixed router. At the end of the measurement window, the distance between nodes is approximately +1100 meters. The router node 107 is located at the center point, or 0.0 m on the travel route 118 of mobile node 102, therefore one half of the measurements $d_1$ are taken as node 102 approaches node 107, and one half are taken as node 102 moves away from node 107. When describing locations along the measurement route, a negative number is used to describe positions along the approaching path (i.e. on the left side of the fixed router in FIG. 3), and positive numbers are used to describe positions along the path moving away from the router node 107 (i.e. on the right side of the fixed router in FIG. 3).

Figure 4:
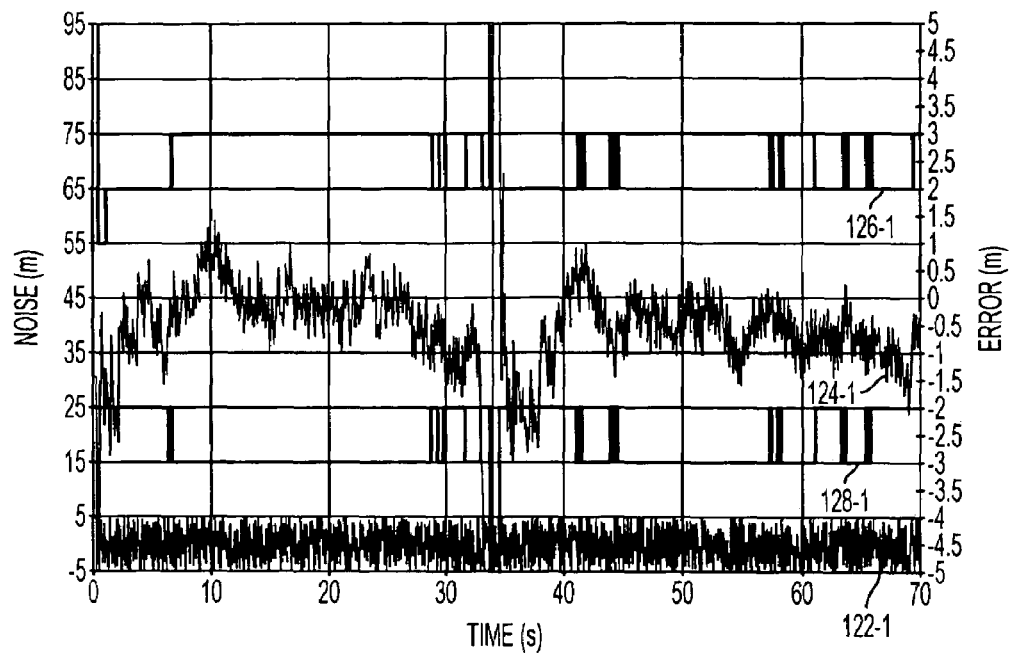
FIG. 4 is a plot illustrating an example of measurement signal characteristics in a first distance measurement scenario in accordance with an embodiment of the present invention.
Figure 5:
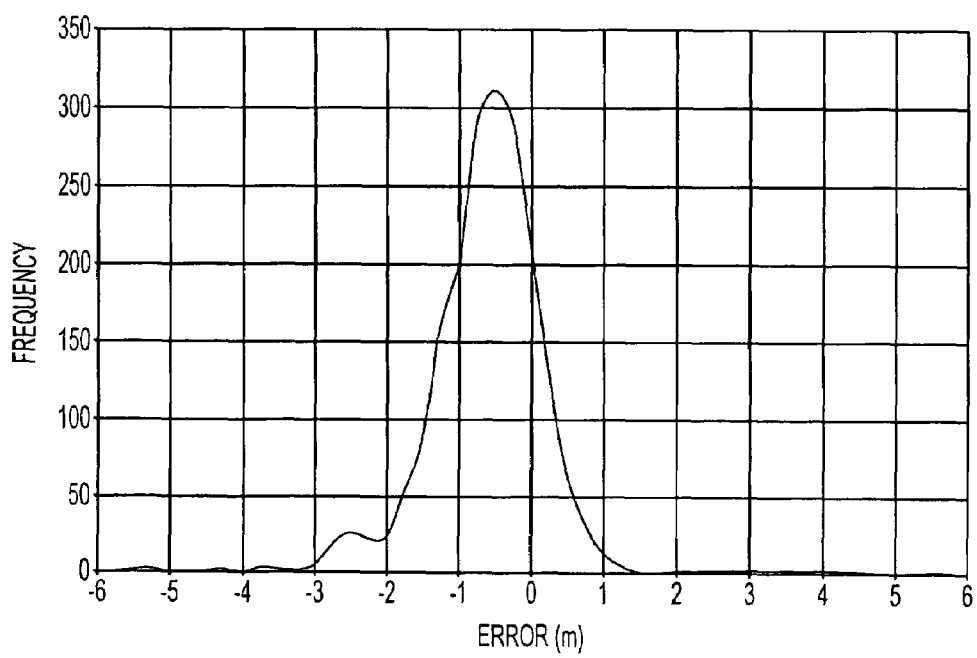
FIG. 5 is a plot illustrating an example of measurement error deviation of the characteristics of FIG. 4.

FIGS. 4 through 15 show distance information gathered by the distance algorithm at either node 102 or node 107, and processed via the multi-path filter described above. FIGS. 4, 6, 8, 10, 12 and 14 each show the variation of distance 120 measurement errors as a function of time. FIG. 4 shows an ideal case of distance measurement between a mobile node 102 and a router node 107 as shown in FIG. 3. FIGS. 4 and 5 plot distance data collected and processed when there are no reflected path signals and noise effect offsets are within +/−5 m.

Figure 6:
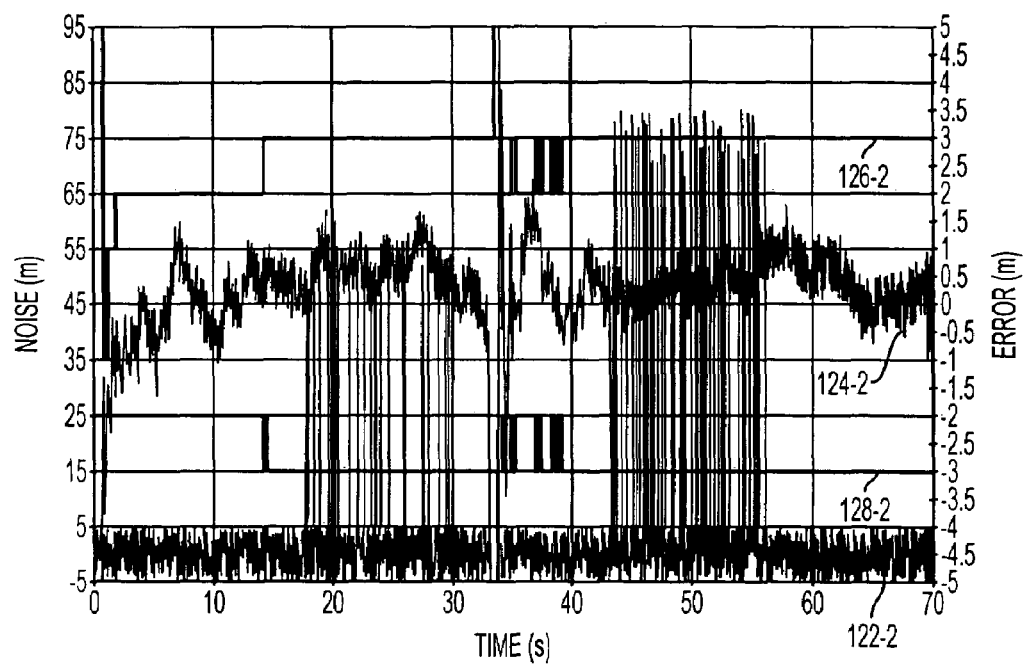
FIG. 6 is a plot illustrating an example of measurement signal characteristics in a second distance measurement scenario in accordance with an embodiment of the present invention.
Figure 7:
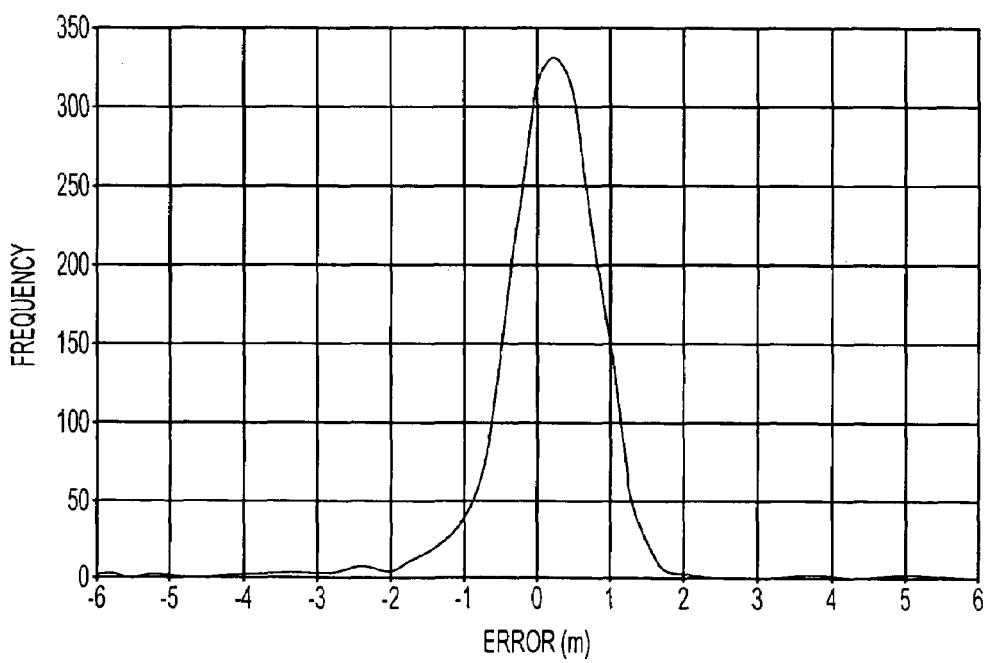
FIG. 7 is a plot illustrating an example of measurement error deviation of the characteristics of FIG. 6.

FIG. 6 shows another case of distance measurement between a mobile node 102 and a router node 107 as shown in FIG. 3. FIGS. 6 and 7 plot distance data collected and processed when there are partial obstructions between nodes 102 and 107 at distances from −500 m to −100 m and from +300 m to +700 m.

Figure 8:
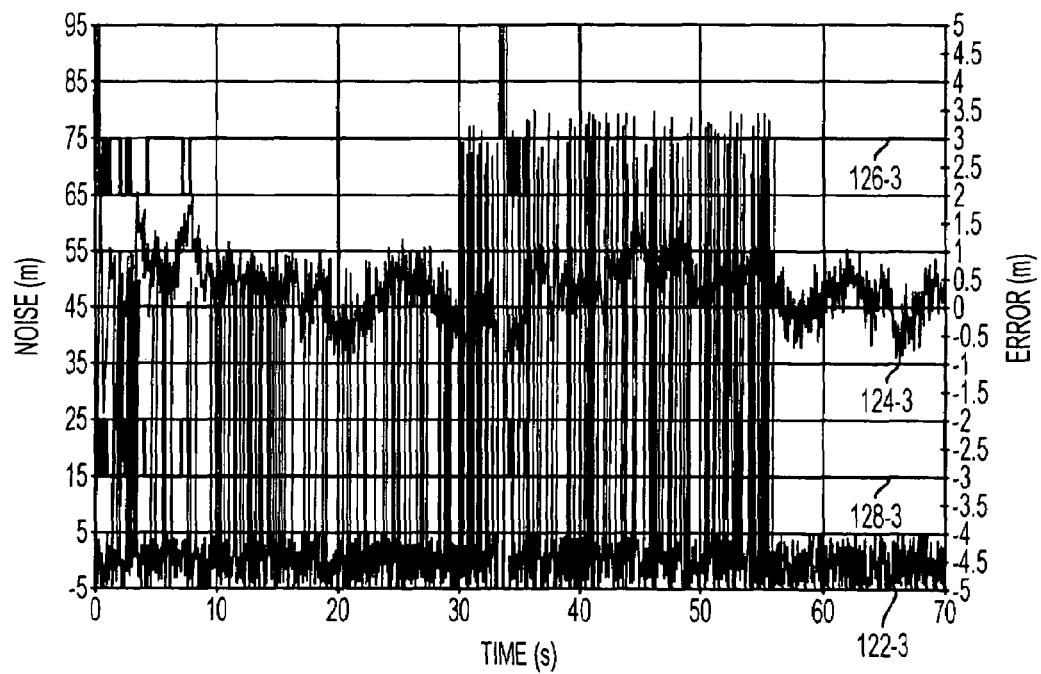
FIG. 8 is a plot illustrating an example of measurement signal characteristics in a third distance measurement scenario in accordance with an embodiment of the present invention.
Figure 9:
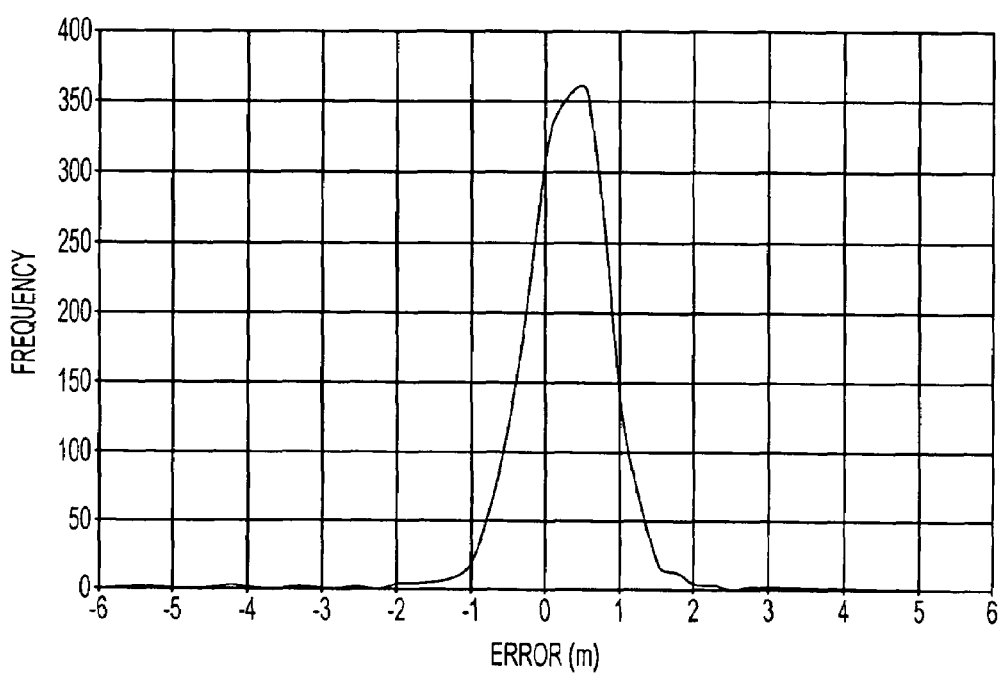
FIG. 9 is a plot illustrating an example of measurement error deviation of the characteristics of FIG. 8.

FIG. 8 shows another case of distance measurement between a mobile node 102 and a router node 107 as shown in FIG. 3. FIGS. 8 and 9 plot distance data collected and processed when there are continuous obstructions between nodes 102 and 107, and the predominant signal reflected path is 50 m to 75 m longer than the direct path.

Figure 10:
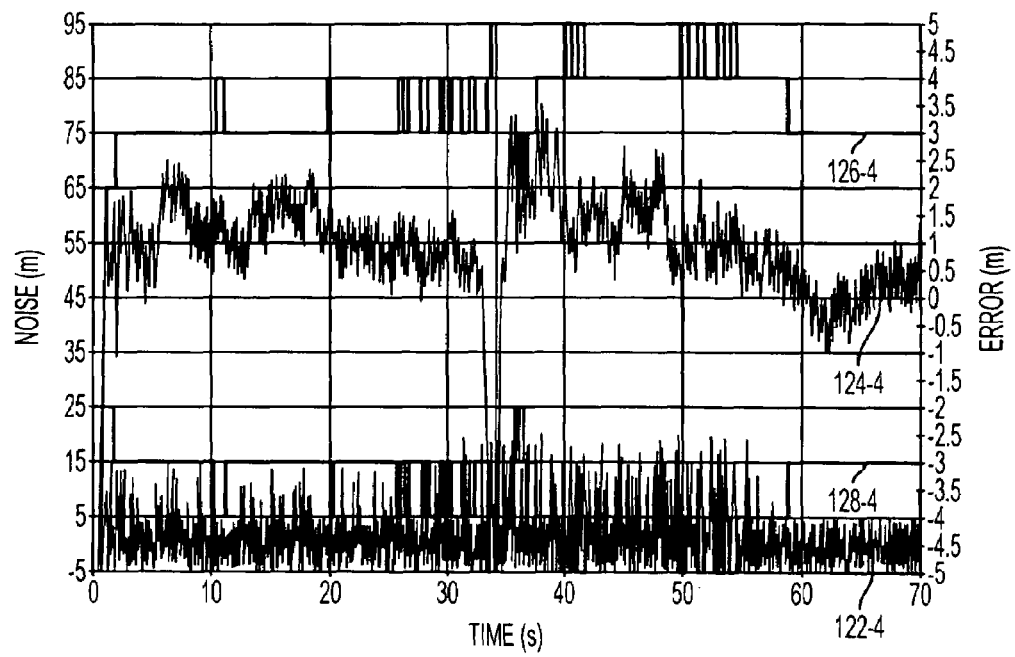
FIG. 10 is a plot illustrating an example of measurement signal characteristics in a fourth distance measurement scenario in accordance with an embodiment of the present invention.
Figure 11:
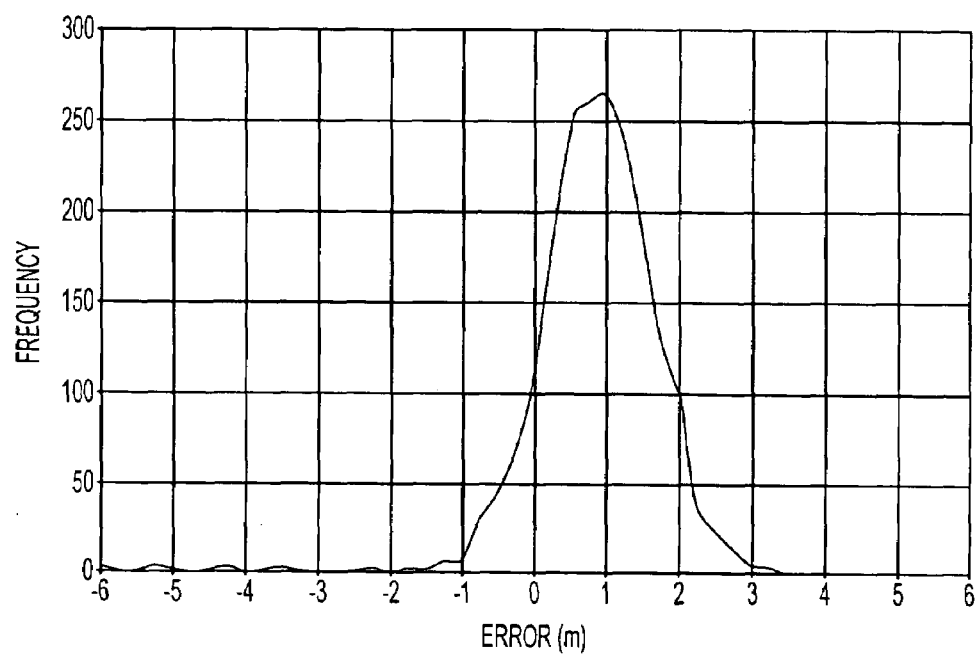
FIG. 11 is a plot illustrating an example of measurement error deviation of the characteristics of FIG. 10.

FIG. 10 shows another case of distance measurement between a mobile node 102 and a router node 107 as shown in FIG. 3. FIGS. 10 and 11 plot distance data collected and processed when there are continuous obstructions between nodes 102 and 107, as in FIGS. 8 and 9, and the predominant signal reflected path length increase varies. In FIGS. 10 and 11, the predominant signal reflected path is 10 m longer than the direct path when the mobile node 102 is left of −100 m (i.e. mobile node 102 is at a distance of −1100 m to −100 m). And the predominant signal reflected path is 15 m longer than the directed path when the mobile node 102 is to the left of +700 m (i.e. mobile node 102 is at a distance of −100 m to +700 m).

Figure 12:
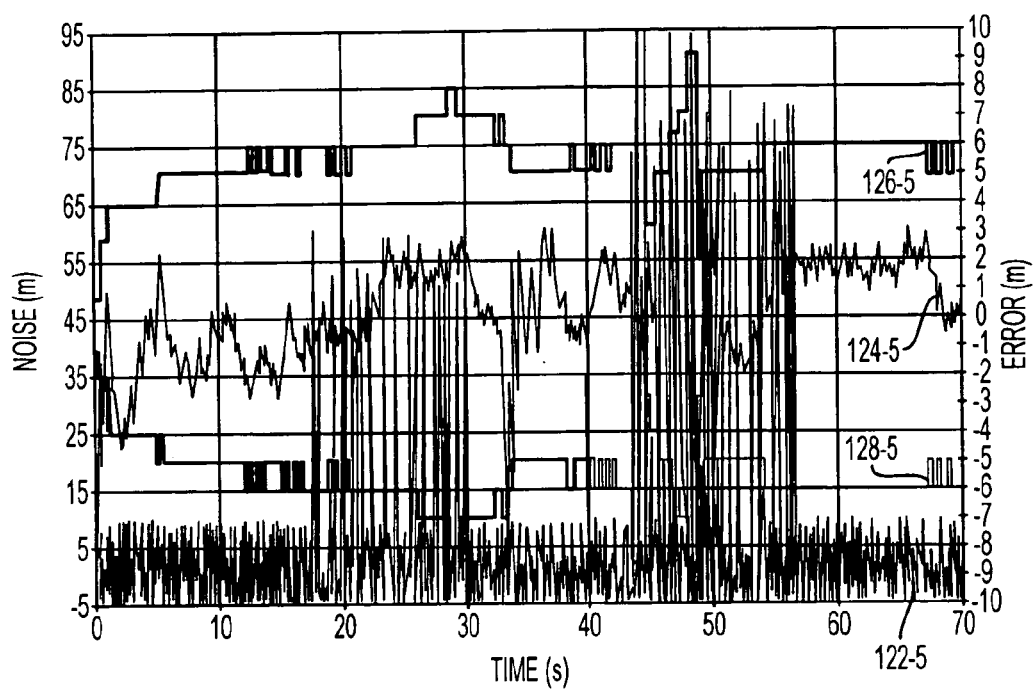
FIG. 12 is a plot illustrating an example of measurement signal characteristics in a fifth distance measurement scenario in accordance with an embodiment of the present invention.
Figure 13:
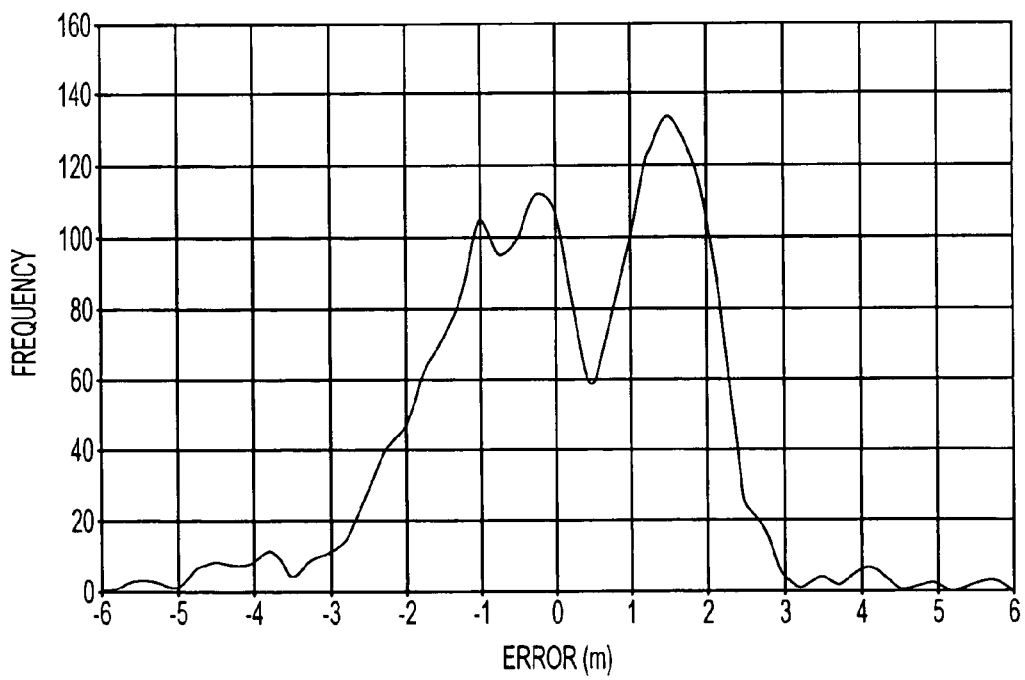
FIG. 13 is a plot illustrating an example of measurement error deviation of the characteristics of FIG. 12.

FIG. 12 shows another case of distance measurement between a mobile node 102 and a router node 107 as shown in FIG. 3. FIGS. 12 and 13 plot distance data collected and processed when there is high noise levels present along the path 118 and obstructions between nodes 102 and 107 from −500 m to −100 m and from +300 m to +700 m. Such high noise could be caused accidentally by other radio devices transmitting on the same or close frequencies and located in the same area, or could be caused by intentional jamming occurring in war situations.

Figure 14:
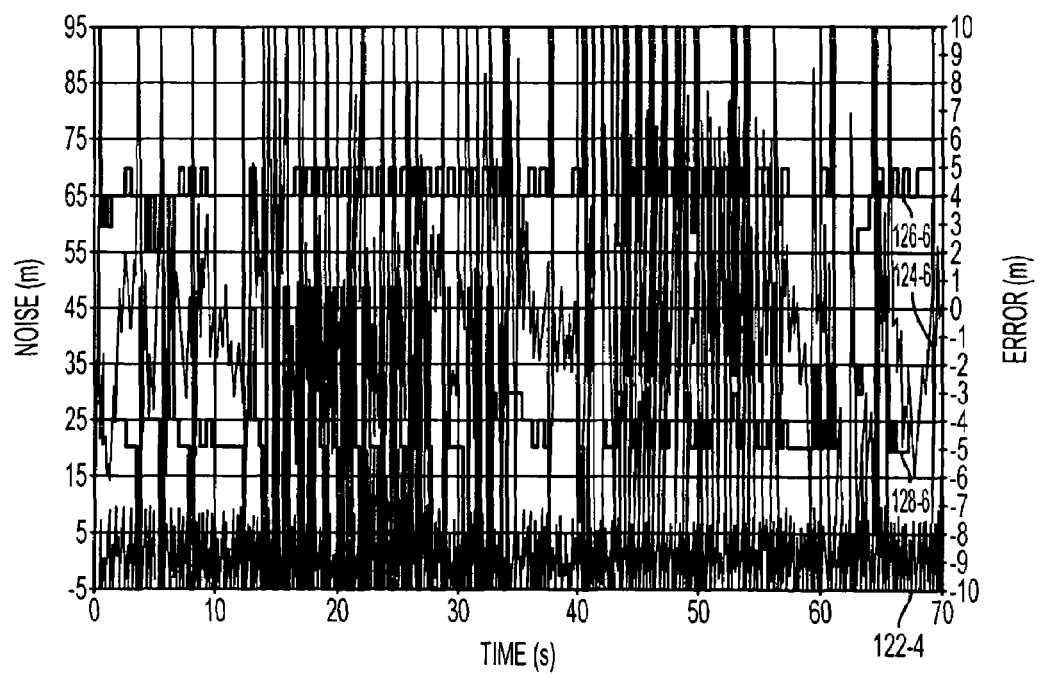
FIG. 14 is a plot illustrating an example of measurement signal characteristics in a sixth distance measurement scenario in accordance with an embodiment of the present invention.
Figure 15:
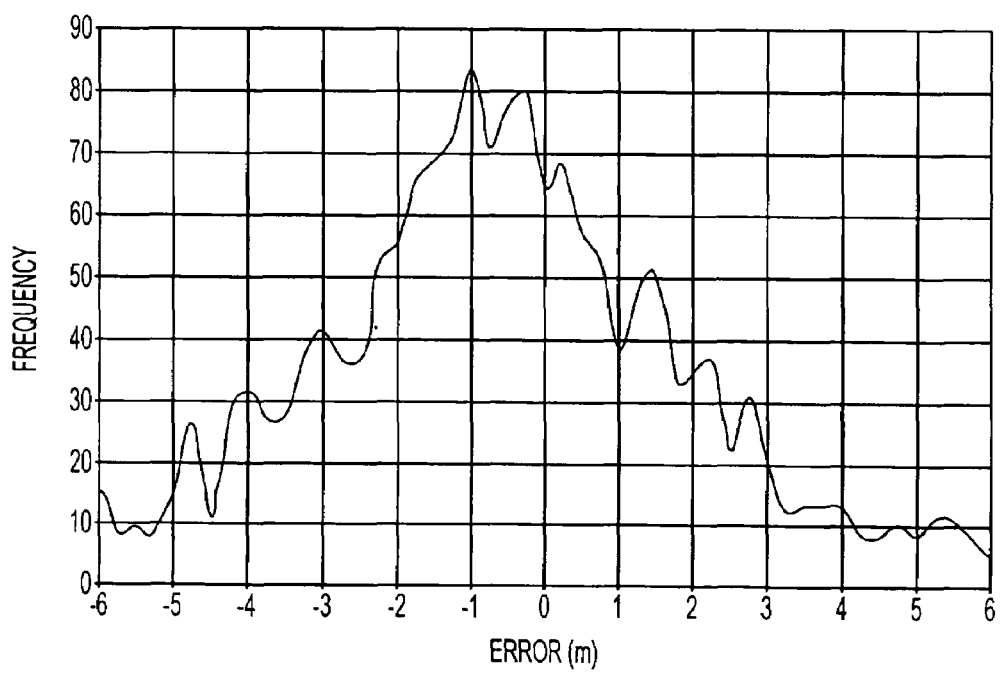
FIG. 15 is a plot illustrating an example of measurement error deviation of the characteristics of FIG. 14.

FIG. 14 shows another case of distance measurement between a mobile node 102 and a router node 107 as shown in FIG. 3. FIGS. 14 and 15 plot distance data collected and processed when the filter restart trigger is changed from σ>10 m to σ>5 m.

The line 122 of FIGS. 4, 6, 8, 10, 12 and 14, shows the distance error of the signal arrival time affected by multipath noise and short time fading. The difference between the real distance 120 and the predicted distance using the algorithm including the multi-path filter in accordance with an embodiment of the present invention is presented by line 124 in FIGS. 4, 6, 8, 10, 12 and 14.

Additionally, in each of FIGS. 4, 6, 8, 10, 12 and 14, the ±σ envelope is shown bounded by lines 126 and 128. The value of the standard deviation of errors σ is computed from the difference between the predicted position and the measured position only for these measurements that have passed the first filter stage of the multi-path filter described above. At this first stage however, real errors shown by line 122 in FIGS. 4, 6, 8 and 10 are unknown, thus they cannot be used for evaluating the standard deviation. FIGS. 5, 7, 9, 11, 13 and 15 each show the distribution of errors from FIGS. 4, 6, 8, 10, 12 and 14, typically as a normal distribution population.

Systematic errors may be introduced by the algorithm of the multi-path filter when there is no multi-path data, such as when all data is correct. In such a case the first filter stage discards away a large number of measurements with positive errors and the predicted distance is shifted toward smaller values than normal. For instance, in optimal conditions the modem measures the time of flight (TOF) on the direct path. The modem provides that measurement as number of clock "ticks" (Tc) which is an integer number, each equaling 31.25 ns. When the mobile node moves in relation to the fixed router, the difference between the real distance and the distance computed from TOF has an error no larger than ½ Tc or smaller than ±9.331/2=±4.67 m. All errors are then uniformly distributed in the interval (+5 m, −5 m). Therefor, in ideal conditions when no multipath is involved, all measurements are within ±5 m from the real value. Since no multipath is involved, all measurements are correct, thus all must be considered as historical data, which is shown in FIG. 4. Since all measurements are within ±5 m from the correct values, the standard deviation of errors is about 3 m. The first stage filter drops all measurements with errors larger than the expected value +0.3*3=expected value +1 m.

The filter retains only values that have errors within the interval (+1 m, −5 m). Because the distribution of errors is uniform, the average position of this interval would be −2 m. Therefore, if both stations are not moving and all measurements are correct, the filter would provide results that have systematic errors of −2 m, the center of the (+1 m, −5 m) interval.

When the algorithm of the multi-path filter restarts due to a very large standard deviation value, the lines of σ envelopes 126 and 128, and the lines of errors 122 show discontinuities. Normally this happens when the mobile node 102 passes the fixed router 107 at about 33 seconds from initial measurements, and the distance variations detected transition from negative to positive values.

Furthermore, tests of the embodiment of the present invention show that the value of the standard deviation σ is always about 60% of the value of error of path data measured by a node. For example, when the distance 120 measured by either node is affected by ±5 m noise, the σ of the predicted distance is ±3 m.

In a first test scenario, the values of which are shown in FIGS. 4 and 5, the received signal is not affected by any reflected path and the noise effect indicated by 122-1 is set to ±5 m. Scenario one is the ideal case that occurs when the line of sight between mobile node 102 and the wireless router 107 of FIG. 3 is not obstructed, making the direct signal very strong. The ±5 m random error is specific to certain systems that make measurements in terms of $T_c$, where one $T_c$ equals 32.125 ns, or alternatively, 9.64 m. Since the measurements of distance 120 are in terms of $T_c$, each measurement has an error within ±0.5 Tc or ±4.67 m (rounded to ±5 m).

The chart of errors for scenario 1 shows that the measured distance 120 between the mobile node 102 and the router 107 of FIG. 3, has an accuracy between +1.5 and −2 m, while the standard deviation of errors is between 2 and 3 meters as shown in FIGS. 4 and 5. There is a discontinuity in the middle of the chart, when the mobile node 102 approaches the fixed router 107. The peak of the error frequency is shifted right by 0.5 m due to the fact that in this case, no incorrect measurements were encountered and the first stage filter eliminated many "good" measurements.

In a second test scenario, partial obstructions between mobile node 102 and router 107 are considered. When the mobile node 102 is between −500 and −100 m from the wireless router, the path to the node 102 is partially obstructed. In this case, 10% of signals received at the router 107 are from reflected paths, while 90% are direct signals. The reflected paths are affected by a random extra path length up to 50 m. After the mobile node 102 passes the wireless router 107 and the distance is between +300 and +700 m, a second obstruction occurs. In this case 85% of received signals are from a direct path while 15% are affected by reflection with a random extra path length up to 75 m. The chart of errors shows a standard deviation of about 3 m, while the chart with the distribution of errors shows that most of the measurements are within ±2 m of the real distances as shown in FIGS. 6 and 7.

In a third test scenario, the path between the mobile node 102 and the wireless router 107 is obstructed from the beginning until the mobile node passes the router and is +700 m away. At the beginning, 10% of received signals are from reflected paths and are affected by a random extra path length of 50 m. When the mobile node 102 is at −100 m from router 107, the modem of the mobile node 102 starts picking another reflected path. This affects 15% of received signals, adding a random extra path length of 75 m. The resulting charts show almost constant standard deviation at 3 m and almost all measurements are affected by errors smaller than ±2 m as shown in FIGS. 8 and 9.

In a fourth test scenario, the case is similar with the third test scenario, except for the length of the extra path. In the fourth scenario, the length of the reflected path is 10 m longer than the direct path when the mobile node 102 is to the left of −100 m, and the length of the reflected path is 15 m longer than the direct path when the mobile node is to the left of +700 m. Such a small difference between the length of the direct and reflected path is difficult to detect using a modem at the router that has a resolution of about 10 m.

FIGS. 10 and 11 show the standard deviation of the fourth scenario changing between 3 m and 4 m, while most of the estimates are affected by errors between −1 m and +3 m. The multi-path filter has difficulties separating the direct path and the secondary path fact that is reflected in the deviation of the peak of error frequency to +1 m.

In a fifth test scenario, the direct path between the mobile node 102 and the fixed router 107 is obstructed when the mobile node is between −500 and −100 m from the router and, between +300 and +700 m from the router. The reflected path is affected by a random extra path length of 50 m during the first obstruction and a random extra path length up to 75 m during the second obstruction. Also, high noise levels are present along the path 118. In this case, the quality of the direct signal is not very good and is affected by random error of ±10 m. This scenario could easily occur where the mobile node moves in heavily congested routes, such as a congested highway, where short term direct path losses are possible to short term fading while metallic bodies of vehicles surrounding the mobile node reflect and diffract the signal.

FIGS. 12 and 13 show a standard deviation between 5 and 7 m, while the errors are between +3 and −5 m. The chart of error distribution shows that the identified errors could be considered as resulting from two or three different processes centered close to zero, −1.0 and +1.5 m.

In a sixth test scenario, the fifth scenario may be repeated and the algorithm is set to restart when the value standard deviation of errors σ is larger than a preset value. In the fifth scenario, the restart trigger was set for σ>10 m, and in the sixth scenario the restart trigger was set to a new threshold value of σ>5 m. FIGS. 14 and 15 show that the effect of this change is catastrophic. The system restarts very often while the standard deviation changes between 3 to 5 m as requested. The distribution of errors shows that a large number of measurements are affected by errors as large as ±6 m. This scenario shows how important it is to provide a correct limit for requesting a restart of the algorithm. Field tests should reveal the correct value of this parameter.

Range data adjusted with this method has the advantage to be fully synchronized, as the filter is queried for distances to all support routers at the same moment. At this time each router is queried sequentially, a fact that makes use of uncorrelated data collected at various moments in time.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for controlling a node in a wireless ad-hoc communications network to provide distance measurement values between nodes of said network using historical data to achieve more accurate results, said method comprising:
controlling a first node to receive a plurality of signals from a second node of said network;
controlling said first node to calculate a distance between said first and second nodes based on said received signals, and to maintain a record of historical measurement data comprising past distance calculations by said first node which were accepted by a filter adapted to eliminate erroneous measurements, said filter having first and second stages; and
controlling said first node to provide at least one distance measurement value between said first and second nodes using at least one of said calculated distance and historical data; and
wherein said step of controlling said first node to provide at least one distance measurement value between said first and second nodes comprises controlling said first node to provide a distance measurement value based upon an approximation using a historical data matrix when said first node receives a number of direct signals from said second node wherein said number of direct signals is insufficient to allow an accurate distance measurement calculation between said first and second nodes using a Time Of Arrival measurement technique.

2. A method as claimed in claim 1, wherein:
said step of controlling said first node to receive said signals comprises controlling said first node to receive said signals via at least one of direct and reflected paths between said first and second nodes; and
said method further comprises controlling said first node to detect, differentiate and measure said signals.

3. A method as claimed in claim 1, wherein said step of controlling said first node to receive said signals comprises controlling said first node to receive said plurality of signals from said second node when said second node is in motion.

4. A method as claimed in claim 1, wherein said step of controlling said first node to calculate said distance comprises controlling said first node to calculate said distance between said first and second nodes based on said received signals using a Time Of Arrival measurement technique.

5. A method as claimed in claim 1, wherein said step of controlling said first node to maintain said record of historical measurement data comprises controlling said first stage of said filter to receive and compare each said calculated distance value with said historical data and in response to said comparison, accept or reject said calculated distance value.

6. A method as claimed in claim 5, wherein said step of controlling said first node to maintain said record of historical measurement data further comprises controlling said fir stage of said filter to reject a calculated distance value if said value is greater than a set limit.

7. A method as claimed in claim 5, wherein said step of controlling said first node to maintain said record of historical measurement data further comprises controlling said first stage of said filter to accept a calculated distance value if said value is less than or equal to a set limit.

8. A method as claimed in claim 1, wherein said step of controlling said first node to maintain said record of historical measurement data comprises controlling said second stage of said filter to receive each accepted value from said first stage of said filter and include each said accepted value in said historical data.

9. A method as claimed in claim 1, wherein said step of controlling said first node to maintain said record of historical measurement data comprises controlling said second stage of said filter to periodically review each value of said historical data and in response to said review, remove a value from said historical data if said value has become outdated.

10. A method as claimed in claim 1, wherein said step of controlling said first node to provide at least one distance measurement value between said first and second nodes comprises controlling said first node to provide a distance measurement value based upon signal Time Of Arrival analysis when said first node receives a number of direct signals from said second node wherein said number of direct signals is sufficient to allow an accurate distance measurement calculation between said first and second nodes using said Time Of Arrival measurement technique.

11. A method as claimed in claim 1, wherein said step of controlling said first node to provide at least one distance measurement value between said first and second nodes further comprises controlling said first node to provide a distance measurement value based upon an approximation using said historical data matrix and at least one of the following equations:

$$\begin{cases} a_{1,1}V + a_{1,2}d_0 = b_1 \\ a_{2,1}V + a_{2,2}d_0 = b_2 \end{cases}$$

where $a_{1,1}$ represents a first value in said matrix, $a_{1,2}$ represents a second value within said matrix, $a_{2,1}$ represents a third value within said matrix, $a_{2,2}$ represents a fourth value within said matrix, $b_1$ represents a fifth value within said matrix and $b_2$ represents a sixth value within said matrix, and variables $V$ and $d_0$ may be used to compute said approximate distance measurement value.

12. A method for controlling a node in a wireless ad-hoc communications network to provide distance measurement values between nodes of said network using historical data to achieve more accurate results, said method comprising:

controlling a fist node to receive a plurality of signals from a second node of said network;

controlling said first node to calculate a distance between said first and second nodes based on said received signals, and to maintain a record of historical measurement data comprising past distance calculations by said first node which were accepted by a filter adapted to eliminate erroneous measurements, said filter having first and second stages; and controlling said first node to provide at least one distance measurement value between said first and second nodes using at least one of said calculated distance and historical data;

wherein said step of controlling said first node to maintain said record of historical measurement data comprises controlling said first node to create a historical data matrix comprising historical measurement data; and said step of controlling said first node to maintain said record of historical measurement data comprises controlling said second stage of said filter to either include or remove a value in said historical data matrix using at least one of the following equations:

$$a_{1,1} = \sum_{i=1}^{n} w^{n-i} t_i^2$$

$$a_{1,2} = a_{2,1} = \sum_{i=1}^{n} w^{n-i} t_i$$

$$a_{2,2} = \sum_{i=1}^{n} w^{n-i}$$

$$b_1 = \sum_{i=1}^{n} w^{n-i} d_i t_i$$

$$b_2 = \sum_{i=1}^{n} w^{n-i} d_i$$

where $a_{1,1}$ represents a first value in said matrix, $a_{1,2}$ represents a second value within said matrix, $a_{2,1}$ represents a third value within said matrix, $a_{2,2}$ represents a fourth value within said matrix, $b_1$ represents a fifth value within said matrix and $b_2$ represents a sixth value within said matrix, w represents a weight variable, and t represents a time at which a distance d exists between said first and second nodes.

13. A system adapted to provide distance measurement values between nodes of a wireless ad-hoc communications network using historical data to achieve more accurate results, said system comprising:

a controller adapted to control a first node to receive a plurality of signals from a second node of said network;

said controller further adapted to control said fire node to calculate a distance between said first and second nodes based on said received signals, and to maintain a record of historical measurement data comprising past distance calculations by said first node which were accepted by a filter adapted to eliminate erroneous measurements, said filter having first and second stages; and said controller further adapted to control said first node to provide at least one distance measurement value between said first and second nodes using at least one of said calculated distance and historical data; and wherein said controller is adapted to control said first node to provide a distance measurement value based upon an approximation using a historical data matrix when said first node receives a number of direct signals from said second node wherein said number of direct signals is insufficient to allow an accurate distance measurement calculation between said first and second nodes using a Time Of Arrival measurement technique.

14. A system as claimed in claim 13, wherein:

said controller is adapted to control said first node to receive said signals via at least one of direct and reflected paths between said first and second nodes; and said first node is adapted to detect, differentiate and measure said signals.

15. A system as claimed in claim 13, wherein said controller is adapted to control said first node to receive said plurality of signals from said second node when said second node is in motion.

16. A system as claimed in claim 13, wherein said controller is adapted to control said first node to calculate said distance between said first and second nodes based on said received signals using a Time Of Arrival measurement technique.

17. A system as claimed in claim 13, wherein said controller is adapted to control said first stage of said filter to receive and compare each calculated distance value with said historical data and in response to said comparison, accept or reject each calculated distance value.

18. A system as claimed in claim 17, wherein said controller is further adapted to control said first stage of said filter to reject a calculated distance value if said value is greater than a set limit.

19. A system as claimed in claim 17, wherein said controller is further adapted to control said first stage of said filter to accept a calculated distance value if said value is less than or equal to a set limit.

20. A system as claimed in claim 13, wherein said controller is adapted to control said second stage of said filter to receive each accepted value from said first stage of said filter and include each said accepted value in said historical data.

21. A system as claimed in claim 13, wherein said controller is adapted to control said second stage of said filter to periodically review each value of said historical data and in response to said review, remove a value from said historical data if said value has become outdated.

22. A system as claimed in claim 13, wherein said controller is adapted to control said first node to provide a distance measurement value based upon signal Time Of Arrival analysis when said first node receives a number of directs from said second node wherein said number of direct signals is sufficient to allow an accurate distance measurement calculation between said first and second nodes using said Time Of Arrival measurement technique.

23. A system as claimed in claim 13, wherein said controller is adapted to control said first node to provide a distance measurement value based upon an approximation using said historical data matrix and at least one of the following equations:

$$\begin{cases} a_{1,1} V + a_{1,2} d_0 = b_1 \\ a_{2,1} V + a_{2,2} d_0 = b_2 \end{cases}$$

where $a_{1,1}$ represents a first value in said matrix, $a_{1,2}$ represents a second value within said matrix, $a_{2,1}$ represents a third value within said matrix, $a_{2,2}$ represents a fourth value within said matrix, $b_1$ represents a fifth value within said matrix and $b_2$ represents a sixth value within said matrix, and variables V and $d_0$ may be used to compute said approximate distance measurement value.

24. A system adapted to provide distance measurement values between nodes of a wireless ad-hoc communications network using historical data to achieve more accurate results, said system comprising:
  a controller adapted to control a first node to receive a plurality of signals from a second node of said network;
  said controller further adapted to control said first node to calculate a distance between said first and second nodes based on said received signals, and to maintain a record of historical measurement data comprising least distance calculations by said first node which were accepted by a filter adapted to eliminate erroneous measurements, said filter having first and second stages; and
  said controller further adapted to control said first node to provide at least one distance measurement value between said first and second nodes using at least one of said calculated distance and historical data;
  wherein said controller is adapted to control said first node to create a historical data matrix comprising historical measurement data; and
  said controller is adapted to control said second stage of said filter to either include or remove a value in said historical data matrix using at least one of the following equations:

$$a_{1,1} = \sum_{i=1}^{n} w^{n-i} t_i^2$$

$$a_{1,2} = a_{2,1} = \sum_{i=1}^{n} w^{n-i} t_i$$

$$a_{2,2} = \sum_{i=1}^{n} w^{n-i}$$

$$b_1 = \sum_{i=1}^{n} w^{n-i} d_i t_i$$

$$b_2 = \sum_{i=1}^{n} w^{n-i} d_i$$

where $a_{1,1}$ represents a first value in said matrix, $a_{1,2}$ represents a second value within said matrix, $a_{2,1}$ represents a third value within said matrix, $a_{2,2}$ represents a fourth value within said matrix, $b_1$ represents a fifth value within said matrix and $b_2$ represents a sixth value within said matrix, w represents a weight variable, and t represents a time at which a distance d exists between said first and second nodes.

* * * * *